United States Patent
Zhou

(10) Patent No.: US 11,012,483 B2
(45) Date of Patent: May 18, 2021

(54) VIDEO STORAGE SYSTEM, AND VIDEO DATA TRANSMISSION METHOD FOR SAME

(71) Applicant: Hangzhou Hikvision Digital Technology Co., Ltd., Zhejiang (CN)

(72) Inventor: Xiaojun Zhou, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 90 days.

(21) Appl. No.: 16/094,083

(22) PCT Filed: Feb. 8, 2017

(86) PCT No.: PCT/CN2017/073081
§ 371 (c)(1),
(2) Date: Oct. 16, 2018

(87) PCT Pub. No.: WO2017/185851
PCT Pub. Date: Nov. 2, 2017

(65) Prior Publication Data
US 2019/0141100 A1 May 9, 2019

(30) Foreign Application Priority Data
Apr. 28, 2016 (CN) .............................. 201610278829

(51) Int. Cl.
*H04L 29/06* (2006.01)
*H04L 29/08* (2006.01)
(Continued)

(52) U.S. Cl.
CPC ........ *H04L 65/4084* (2013.01); *H04L 41/046* (2013.01); *H04L 43/0876* (2013.01);
(Continued)

(58) Field of Classification Search
CPC ................................................. H04N 21/222
(Continued)

(56) References Cited

U.S. PATENT DOCUMENTS 8,041,798 B1 * 10/2011 Pabla .................... G06F 9/5072
709/201
2008/0285436 A1 * 11/2008 Robinson ............ H04L 12/4633
370/217
(Continued)

FOREIGN PATENT DOCUMENTS

CN          101094102 A        12/2007
CN          101447910 A         6/2009
(Continued)

*Primary Examiner* — Nasser M Goodarzi
*Assistant Examiner* — Jaycee Imperial
(74) *Attorney, Agent, or Firm* — Bret E. Field; Bozicevic, Field & Francis EEP

(57) ABSTRACT

The present application discloses a system for video storage and method for video data transmission based on the same. The system for video storage in the present application includes a first control node, a second control node and at least two storage nodes. Each control node includes a signal agent module, and each storage node includes a data agent module. The second control node is configured for starting the signal agent module of the second control node after determining that the first control node is unavailable. The signal agent module of the second control node is configured for transmitting an instruction to the data agent module of a designated storage node based on a service request through a preset virtual IP address. The data agent module of the designated storage node is configured for transmitting video data to the third-party platform according to the received instruction and based on the predetermined signal protocol. This can effectively avoid the single point of failure and ensure the stability of the system.

12 Claims, 5 Drawing Sheets

(51) Int. Cl.
  *H04N 21/222* (2011.01)
  *H04L 12/26* (2006.01)
  *H04L 12/24* (2006.01)
  *H04L 29/12* (2006.01)

(52) U.S. Cl.
  CPC .......... *H04L 43/10* (2013.01); *H04L 61/2007* (2013.01); *H04L 61/2514* (2013.01); *H04L 65/1006* (2013.01); *H04L 65/605* (2013.01); *H04L 65/80* (2013.01); *H04L 67/1008* (2013.01); *H04L 67/1014* (2013.01); *H04L 67/1034* (2013.01); *H04L 67/1097* (2013.01); *H04L 67/2809* (2013.01); *H04L 67/2842* (2013.01); *H04N 21/222* (2013.01); *H04L 61/103* (2013.01); *H04L 61/6022* (2013.01)

(58) Field of Classification Search
  USPC .......................................................... 725/87
  See application file for complete search history.

(56) References Cited

U.S. PATENT DOCUMENTS

| | | | | |
|---|---|---|---|---|
| 2010/0138625 | A1* | 6/2010 | Noguchi | G06F 8/65 |
| | | | | 711/167 |
| 2013/0080510 | A1 | 3/2013 | Leftik et al. | |
| 2015/0081767 | A1* | 3/2015 | Evens | H04L 67/1004 |
| | | | | 709/203 |
| 2015/0237155 | A1 | 8/2015 | Power et al. | |
| 2015/0356762 | A1* | 12/2015 | Kawawa | G06F 3/14 |
| | | | | 345/629 |
| 2016/0127509 | A1* | 5/2016 | Uriel | H04L 61/103 |
| | | | | 709/203 |
| 2017/0094002 | A1* | 3/2017 | Kumar | H04L 67/1097 |

FOREIGN PATENT DOCUMENTS

| | | |
|---|---|---|
| CN | 102714615 A | 10/2012 |
| CN | 103220183 A | 7/2013 |
| CN | 104765661 A | 7/2015 |

* cited by examiner and a data agent module. The signal agent module of the first control node interacts with a third-party platform based on a predetermined signal protocol through a preset virtual IP address.

VIDEO STORAGE SYSTEM, AND VIDEO DATA TRANSMISSION METHOD FOR SAME

The present application claims the priority to a Chinese Patent Application No. 201610278829.7, filed with the China National Intellectual Property Administration on Apr. 28, 2016 and entitled "Video storage system and video data transmission method for the same", which is incorporated herein by reference in its entirety.

TECHNICAL FIELD

The present application relates to the field of computer, and in particular to video cloud storage technology.

BACKGROUND

GB/T28181 is a surveillance signal transmission standard protocol based on Session Initiation Protocol (SIP). The applicant of the present application finds that in the GB/T28181 protocol, a system establishes a communication with a SIP server through a SIP agent device. Once the SIP agent device goes down, the system cannot communicate with the SIP server. The entire interaction process cannot proceed because of a single point of failure.

SUMMARY

Embodiments of the present application aim to provide a system for video storage and method for video data transmission based on the same, to effectively avoid the single point of failure and ensure the stability of the system.

To solve the technical problem described above, an embodiment of the present application discloses a system for video storage including a first control node, a second control node, and at least two storage nodes.

The at least two storage nodes are configured for storing video data.

Each of the control nodes includes a signal agent module, and each of the storage nodes includes a data agent module.

The signal agent module of the first control node is configured for interacting with a third-party platform based on a predetermined signal protocol through a preset virtual IP address.

The second control node is configured for starting the signal agent module of the second control node after determining that the first control node is unavailable.

The signal agent module of the second control node is configured for, through the preset virtual IP address, receiving a service request from the third-party platform based on the predetermined signal protocol, and transmitting an instruction to the data agent module of a designated storage node based on the service request.

The data agent module of the designated storage node is configured for transmitting video data to the third-party platform according to the received instruction and based on the predetermined signal protocol.

Because a signal agent module is provided in each of multiple control nodes and a data agent module is provided in each of multiple storage nodes in the embodiment of the present application, in the event that the first control node is unavailable, the system may switch to the signal agent module of another control node to continue to interact with the third-party platform based on the signal protocol through the same virtual IP address. As such, the single point of failure can be effectively avoided and the stability of the system can be ensured. Further, multiple control nodes use the same virtual IP address to control the storage nodes. Therefore, after the first control node is unavailable, the data agent modules of the storage nodes do not need to be re-registered to a new IP address, simplifying the switching process and shortening the switching time.

In an embodiment of the present application, the first control node and/or the second control node further includes:

an IP obtaining unit, configured for periodically obtaining an IP address of the control node where it is located; and a signal agent control unit, configured for controlling the signal agent module of the control node where it is located, based on the IP address of this control node obtained by the IP obtaining unit and a current state of the signal agent module of this control node; wherein if the IP address of this control node is the same as the preset virtual IP address and the signal agent module of this control node has not been started yet, the signal agent control unit starts the signal agent module of this control node; or, if the IP address of this control node is different from the preset virtual IP address and the signal agent module of this control node has been started, the signal agent control unit stops the signal agent module of this control node.

In an embodiment of the present application, the signal agent module includes:

a system pressure information acquisition unit, configured for periodically receiving a system pressure information of each of the storage nodes from the data agent module of this storage node; and a service assignment unit, configured for, when receiving a service request for obtaining the video data from the third-party platform, based on the system pressure information of each of the storage nodes received by the system pressure information acquisition unit, selecting N storage nodes currently having the minimum system pressures, then selecting, from the N storage nodes, a storage node that has been distributed the least number of services, and notifying the data agent module of this storage node to transmit the video data to the third-party platform; wherein N is a positive integer and less than the total number of the storage nodes in the system for video storage.

The service assignment unit finds firstly the N storage nodes with the minimum system pressures, and then selects a storage node that has been distributed the least number of services from the N storage nodes to process the service and transmit video data. In this way, the service will not be distributed to a storage node too many resources (such as CPU, memory) of which are occupied by non-video services, and thereby interruption of video data services or failure of service assignment is avoided.

In an embodiment of the present application, the date agent module includes:

a pressure information reporting unit, configured for transmitting to the signal agent module the system pressure information of a storage node where the data agent module is located.

In an embodiment of the present application, the virtual IP address is preset based on Linux virtual server technology.

In an embodiment of the present application, the predetermined signal protocol is a GB/T28181 protocol.

An embodiment of the present application further discloses a method for video data transmission based on a system for video storage. The system for video storage includes: a first control node, a second control node and at least two storage nodes. The at least two storage nodes are configured for storing video data. Each control node includes a signal agent module. Each storage node includes a data agent module. The signal agent module of the first control node interacts with a third-party platform based on a predetermined signal protocol through a preset virtual IP address. The method includes:

starting, by the second control node, the signal agent module of the second control node after the second control node determines that the first control node is unavailable;

receiving a service request from the third-party platform based on the predetermined signal protocol through the preset virtual IP address, and transmitting an instruction to the data agent module of a designated storage node based on the service request, by the signal agent module of the second control node; and transmitting, by the data agent module of the designated storage node, video data to the third-party platform according to the received instruction, based on the predetermined signal protocol.

Because a signal agent module is provided in each of multiple control nodes and a data agent module is provided in each of multiple storage nodes in the embodiment of the present application, in the event that the first control node is unavailable, the system may switch to the signal agent module of another control node to continue to interact with the third-party platform based on the signal protocol through the same virtual IP address, thereby effectively avoiding the single point of failure and ensuring the stability of the system. Further, multiple control nodes use the same virtual IP address to control the storage nodes. Therefore, after the first control node is unavailable, the data agent modules of the storage nodes do not need to be re-registered to a new IP address, simplifying the switching process and shortening the switching time.

In an embodiment of the present application, the method for video data transmission based on a system for video storage, further includes:

periodically obtaining, by each of the control nodes, an IP address of this control node, and if the IP address of this control node is the same as the preset virtual IP address and the signal agent module of this control node has not been started yet, starting the signal agent module of this control node, or if the IP address of this control node is different from the preset virtual IP address and the signal agent module of this control node has been started, stopping the signal agent module of this control node.

In an embodiment of the present application, the method for video data transmission includes: presetting the virtual IP address based on Linux virtual server technology.

In an embodiment of the present application, the method for video data transmission further includes: periodically receiving system pressure information of each of the storage nodes from the data agent module of the storage node.

Transmitting an instruction to the data agent module of the designated storage node based on the service request includes: based on the system pressure information of each of the storage nodes, selecting N storage nodes currently having the minimum system pressures, then selecting, from the N storage nodes, a storage node that has been assigned the least number of services, and notifying the data agent module of this storage node to transmit the video data to the third-party platform; wherein N is a positive integer and less than the total number of the storage nodes in the system for video storage.

The service assignment unit finds firstly the N storage nodes with the minimum system pressures, and then selects a storage node that has been assigned the least number of services from the N storage nodes to process the service and transmit video data. In this way, the service will not be assigned to a storage node too many resources (such as CPU, memory) of which are occupied by non-video services, and thereby interruption of video data services or failure of service assignment is avoided.

In an embodiment of the present application, the predetermined signal protocol is a GB/T28181 protocol.

An embodiment of the present application further discloses an application program that, when executed, performs the method for video data transmission based on a system for video storage described above.

An embodiment of the present application further discloses a storage medium for storing an application program that, when executed, performs the method for video data transmission based on a system for video storage described above.

DETAILED DESCRIPTION

In the following description, a number of technical details are set forth for readers to better understand the present application. However, those skilled in the art could understand that the technical solutions claimed in the claims of the present application can be implemented without these technical details and variations and modifications of the following embodiments.

In order to make the objects, technical solutions and advantages of the present application more clear, the embodiments of the present application will be further described in detail below with reference to the accompanying drawings.

Figure 1:
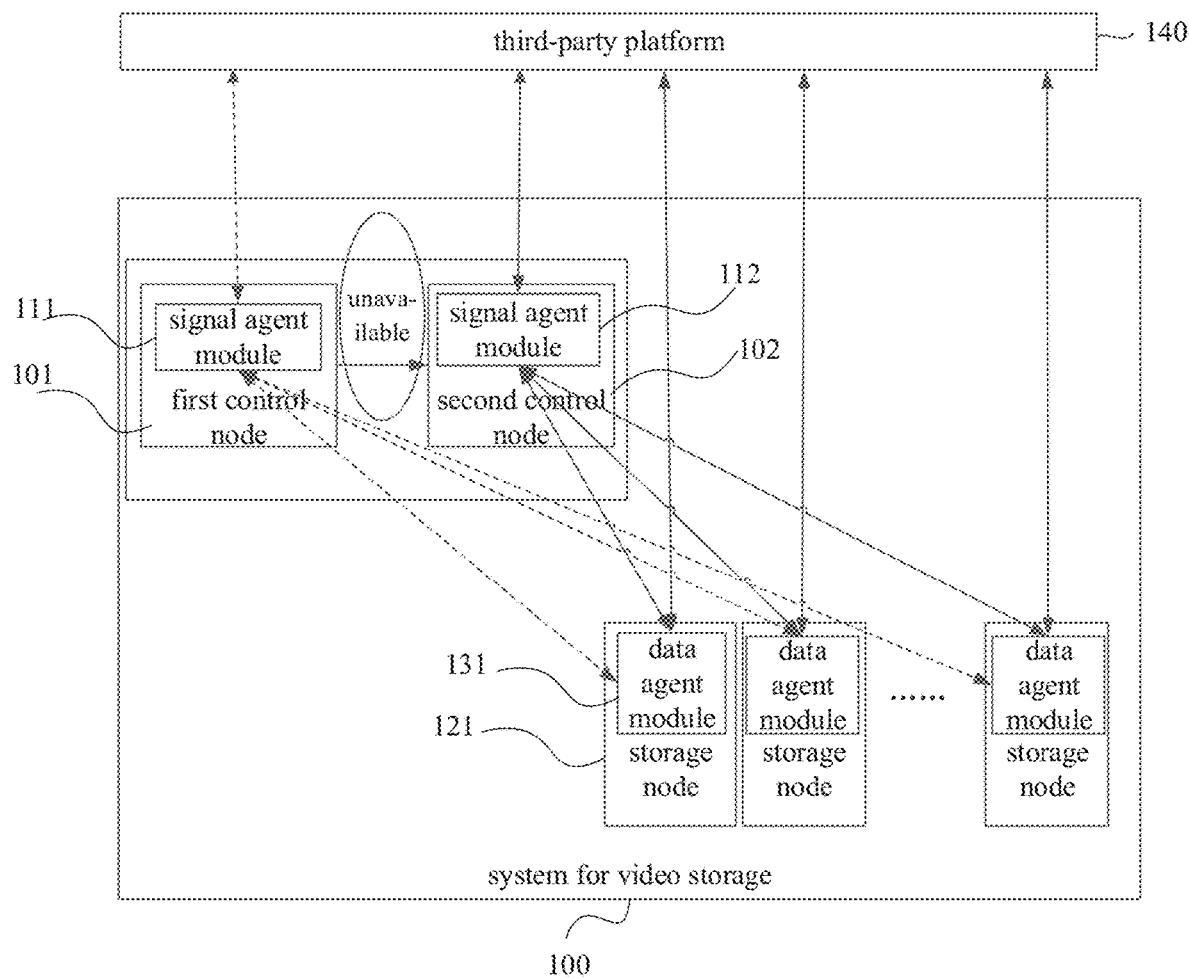
FIG. 1 is a schematic diagram of the structure of a system for video storage according to a first embodiment of the present application.

A first embodiment of the present application relates to a system for video storage. FIG. 1 is a schematic diagram of the structure of a system for video storage 100. The system for video storage 100 of the first embodiment of the present application interacts with a third-party platform 140 using a predetermined signal protocol. It can be understood that, in the system for video storage 100, a plurality of nodes simultaneously provide services to external entities.

As shown in FIG. 1, the system for video storage 100 includes:

a first control node 101, a second control node 102 and at least two storage nodes 121. The at least two storage nodes 121 are configured for storing video data. Each control node includes a signal agent module. Each storage node includes a data agent module 131. A signal agent module 111 of the first control node 101 may interact with a third-party platform 140 based on a predetermined signal protocol through a preset virtual IP address. The signal agent module 111 of the first control node 101 that functions properly may receive a service request from the third-party platform 140 based on the predetermined signal protocol, and transmit an instruction to the data agent module of a designated storage node based on the service request. The second control node 102 may start a signal agent module 112 of the second control node 102 after determining that the first control node 101 is unavailable. The signal agent module 112 of the second control node 102 may, through the preset virtual IP address, receive a service request from the third-party platform 140 based on the predetermined signal protocol, and transmit an instruction to the data agent module of a designated storage node based on the service request. A data agent module 131 of the designated storage node may transmit video data to the third-party platform 140 according to the instruction and based on the predetermined signal protocol.

In the embodiment of the present application, the number of the control nodes in the system for video storage may be two or more, which is not limited herein. The designated storage node may be one or more storage nodes.

In the embodiment of the present application, video data stored on a storage node may be from a surveillance camera. The storage node stores the video data in segments, each of which is a record of the surveillance camera over a period of time (e.g., 10 minutes or half an hour). The video data stored on the storage node may be raw video data, or may be video data obtained by adding analysis information (for example, license plate information (obtained by image identification)) into the raw video data.

The at least two control nodes are configured for managing the storage nodes, for example, instructing one storage node to transmit video data to the third-party platform, or instructing one storage node to stop storing video data.

As described above, each control node includes a signal agent (abbreviated as "SA") module for signal interaction with a third-party platform based on the predetermined signal protocol. Specifically, the predetermined signal protocol may be GB/T28181 protocol. It can be understood that other signal protocols, such as the SIP, may be applied in other embodiments of the present application, as long as the communication between the third-party platform and the system for video storage can be achieved.

Each of the storage nodes above includes a data agent (abbreviated as "DA") module for transmitting the video data to the third-party platform based on the signal protocol. It can be appreciated that in an embodiment, the signal agent module and the data agent module may be in the form of service processes. In another embodiment, they may be in the form of a thread, a hardware module, or the like, as long as they can achieve the functions described herein.

Optionally, the signal agent module of only one of the at least two control nodes is registered at one third-party platform at any time. The control node registered at the third-party platform controls each of the storage nodes.

It can be understood that one system for video storage may interact with one or more third-party platforms, but the signal agent module of only one control node in the system for video storage is registered at one third-party platform at any time. If the signal agent module of the control node previously registered at a certain third-party platform cannot function properly, the signal agent module of another control node in the system for video storage will register at this third-party platform.

Since signal agent modules are implemented in multiple control nodes and data agent modules are implemented in multiple storage nodes, the single point of failure is effectively avoided and the stability of the system is ensured.

In an embodiment, since the control nodes in the system handle registrations of data agent modules through a common virtual IP address, when the first control node is replaced by another control node because it cannot function properly, there is no need for the data agent modules to re-register.

The control node described above may further include the following units to control the start and stop of the signal agent module:

an IP obtaining unit, configured for periodically obtaining an IP address of the control node; and a signal agent control unit, configured for controlling the signal agent module of the control node based on the IP address obtained by the IP obtaining unit and a current state of the signal agent module of this control node. If the IP address of this control node is the same as the preset virtual IP address and the signal agent module of this control node has not been started yet, the signal agent module of this control node may be started to be used to the full, because the fact that the IP address of this control node is the same as the preset virtual IP address indicates the signal agent module of this control node can interact with the data agent modules and the third-party platform through the preset IP address.

If the IP address of this control node is different from the preset virtual IP address and the signal agent module of this control node has been started, the signal agent module of this control node may be stopped in order to avoid the waste of network resources and speed up operations of the system, because the fact that the IP address of this control node is different from the preset virtual IP address indicates the signal agent module of this control node cannot interact with the data agent modules and the third-party platform through the preset IP address.

In another embodiment, N storage nodes with the minimum system pressure may be found first, and a storage node that has been assigned the least number of services is then selected from the N storage nodes. This avoids the interruption of video data services or failure of service allocation caused by the system assigning video related services to a storage node, too many resources of which are occupied by non-video services. Specifically:

the signal agent control module may include:

a system pressure information acquisition unit, configured for periodically receiving system pressure information of the storage nodes from their data agent module; and a service assignment unit, configured for, when receiving a service request for obtaining video data from the third-party platform, selecting N storage nodes currently having the minimum system pressure based on the system pressure information of the storage nodes received by the system pressure information acquisition unit, then selecting a storage node that has been assigned the least number of services from the N storage nodes, and notifying the data agent module of the selected storage node to transmit video data to the third-party platform; wherein N is a positive integer and less than the total number of the storage nodes in the system for video storage.

Optionally, "selecting N storage nodes currently having the minimum system pressures" described above means sorting all storage nodes (e.g., X nodes) based on their current system pressures in ascending order and selecting the first N storage nodes from the sorted X storage nodes. For example, N is 3, and there are 5 storage nodes and the values of their current system pressures are 9, 8, 7, 6 and 6 respectively. The values of current system pressures of the selected N storage nodes are then 7, 6 and 6. For another example, N is 4, and there are 7 storage nodes and the values of their current system pressures are 9, 8, 6, 6, 6, 4 and 3 respectively. The values of the current system pressures of the selected N storage nodes are 6, 6, 4 and 3. In this example, because there are 3 storage nodes with the current system pressure of 6, any 2 of them can be selected. These 2 storage nodes and the other 2 storage nodes with the current system pressures of 4 and 3 form the N storage nodes currently having the minimum system pressures.

Optionally, N is half of the total number of the storage nodes in the system for video storage. In addition, it can be understood that in other embodiments of the present application, N may be another number, such as 30% or 60% of the total number of the storage nodes, or N may also be a predetermined fixed number.

Optionally, "selecting a storage node that has been assigned the least number of services" means calculating the number of the assigned services of each storage node and selecting the storage node with the least number of services. In an example, the assigned services are in units of the number of video streams, and the number of the assigned services is the number of connections of the current video streams on one storage node. In another example, when the control node assigns a service to a storage node, the number of services of this storage node is increased by 1. When a service is finished, the number of services of this storage node is decreased by 1. The number of assigned services is the number of services that have been assigned to the storage node but have not yet been finished.

It can be understood that the service in the embodiment of the present application may be a video related service, such as a task for obtaining streams.

Optionally, the data agent module described above includes: a pressure information reporting unit, configured for transmitting to the signal agent module the system pressure information of the storage node where the data agent module is located. It can be understood that the pressure information reporting unit of each data agent module may directly transmit the respective system pressure information to a signal agent module of each control node. Alternatively, the pressure information reporting unit of each data agent module may firstly transmit the respective system pressure information to one of the control nodes (for example, one control node registered on the third-party platform, or one control node transmitting instructions to each control node), and then this control node transmits the system pressure information of each data agent module to other control nodes.

It should be noted that each unit and/or module mentioned in embodiments of the device in the present application is a logical unit and/or module. Physically, one logical unit and/or module may be one physical unit and/or module, may be a part of one physical unit and/or module, or may be implemented as a combination of multiple physical units and/or modules. The physical implementation of these logical units and/or modules is not the most important, and the combination of the functions implemented by these logical units and/or modules is the key to solving the technical problems raised by the present application. In addition, in order to highlight the inventive concept of the present application, in the description of the device embodiments of the present application above, units and/or modules that are not closely related to the solution of the technical problems raised by the present application are not introduced, which does not indicate that there are no other units and/or modules in the device embodiments described above.

Figure 2:
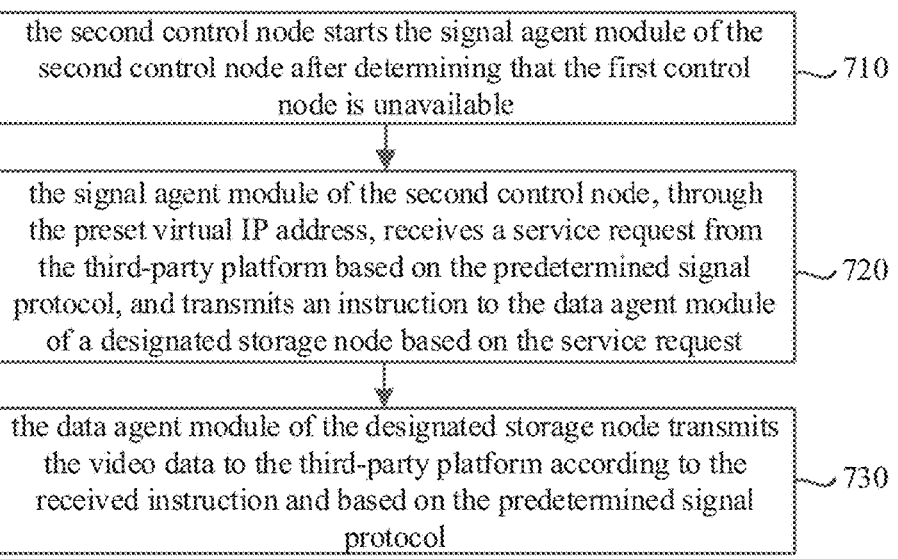
FIG. 2 is a schematic flowchart of a method for video data transmission based on a system for video storage according to a second embodiment of the present application.

A second embodiment of the present application relates to a method for video data transmission based on a system for video storage. The system for video storage includes: a first control node, a second control node and at least two storage nodes. The at least two storage nodes are configured for storing video data. Each control node includes a signal agent module. Each storage node includes a data agent module. The signal agent module of the first control node interacts with a third-party platform based on a predetermined signal protocol through a preset virtual IP address. As shown in FIG. 2, the method includes the following steps.

At step 710, the second control node starts the signal agent module of the second control node after determining that the first control node is unavailable.

At step 720, the signal agent module of the second control node, through the preset virtual IP address, receives a service request from the third-party platform based on the predetermined signal protocol, and transmits an instruction to the data agent module of a designated storage node based on the service request.

At step 730, the data agent module of the designated storage node transmits the video data to the third-party platform according to the received instruction and based on the predetermined signal protocol.

In the embodiment of the present application, when the first control node functions properly (for example, before the first control node goes down), the signal agent module of the first control node registers on the third-party platform through the preset virtual IP address, receives the service request from the third-party platform based on the predetermined signal protocol, and transmits the instruction to the data agent module of the designated storage node according to the service request. Once it is determined that the first control node is unavailable, the signal agent module of the first control node is stopped.

Figure 3:
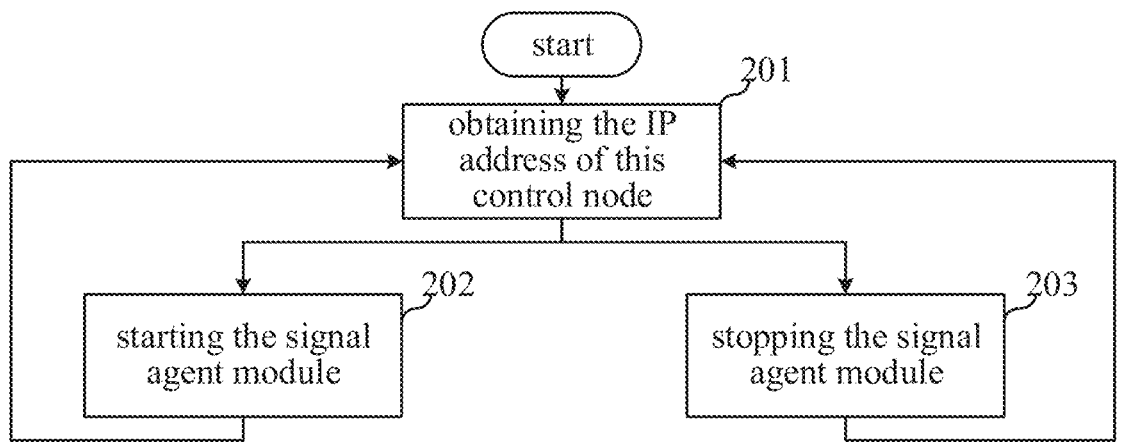
FIG. 3 is a schematic diagram of specific steps of a method for video data transmission based on a system for video storage according to another preferred embodiment of the present application.

In another preferred embodiment of the present application, as shown in FIG. 3, the method above further includes the following steps.

At step 201, each control node (i.e., the management node as illustrated in FIG. 3) periodically obtains the IP address of this control node. If the IP address of this control node is the same as the preset virtual IP address and the signal agent module of this control node has not been started yet, the method may proceed to step 202 to start the signal agent module of this control node. If the IP address of this control node is different from the preset virtual IP address and the signal agent module of this control node has been started, the method may proceed to step 203 to stop the signal agent module of this control node.

In the present embodiment, one of the control nodes is the main control node, and the other control nodes are standby control nodes. In the event that the main control node becomes unavailable, a standby control node operates as the main control node. The main control node communicates with the third-party platform and storage nodes through the preset virtual IP address.

Moreover, it can be appreciated that in an embodiment, the signal agent module and the data agent module may be service processes. In other embodiments, they may be in the form of a thread, a hardware module, or the like, as long as they can achieve the functions described herein.

In various embodiments of the present application, the start of the signal agent module may be starting a function of the signal agent module, such as the start of a signal agent service process. The stop of the signal agent module may be stopping a function of the signal agent module, such as the stop of the signal agent service process. The start and stop of the data agent module are similar to these.

Of course, the start of the signal agent module may also be starting a signal agent thread, a hardware module, or the like. The stop of the signal agent module may also be stopping a signal agent thread, a hardware module, or the like. The start and stop of the data agent module are similar to these.

Figure 7:
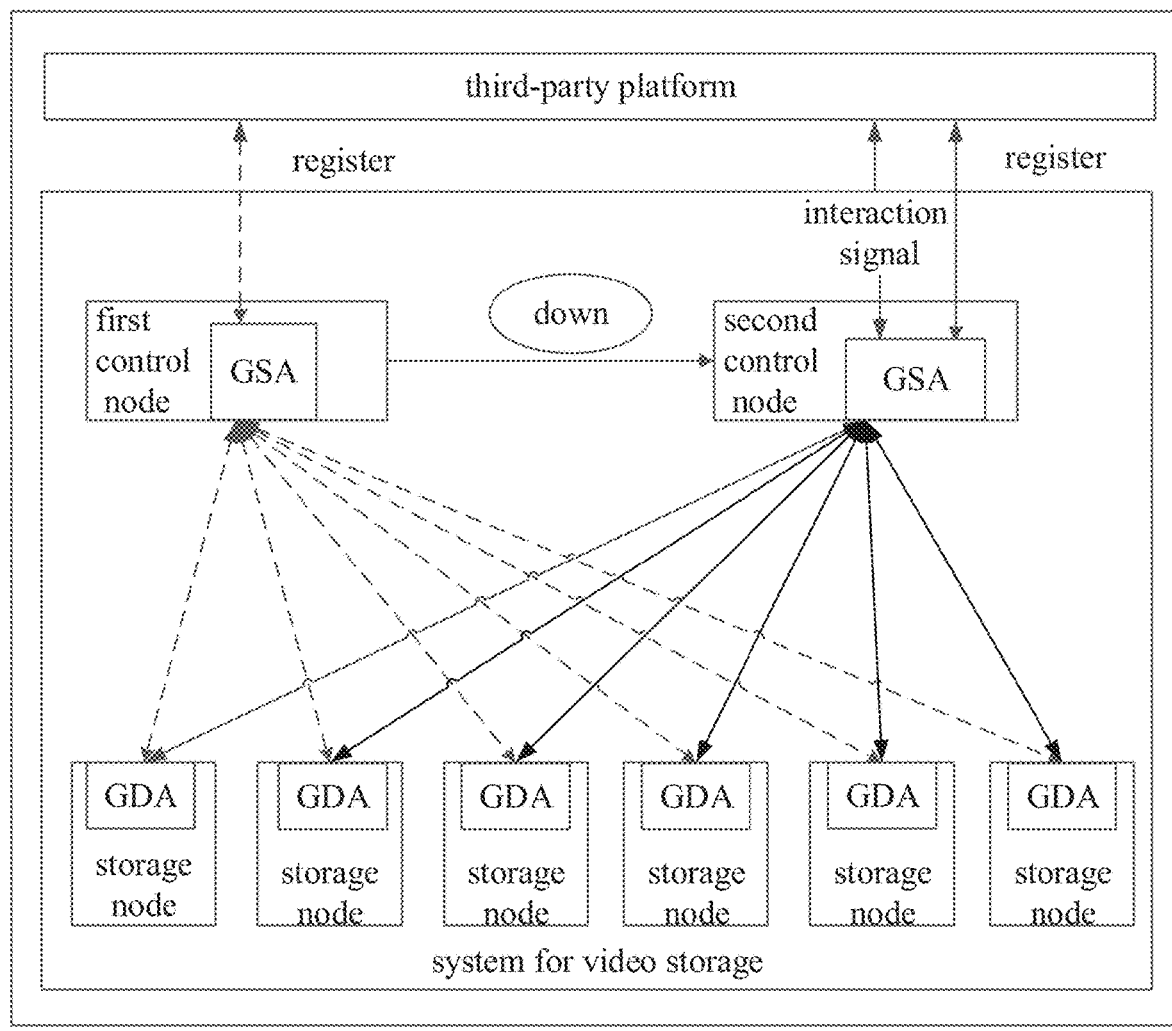
FIG. 7 is a schematic diagram of the structure of a system for video storage that executes a method for video data transmission according to an embodiment of the present application.

In an example that the predetermined signal protocol is the GB/T28181 protocol, as shown in FIG. 7, the control nodes in the system for video storage may include both main and standby scheduling control nodes, i.e., the first control node and the second control node in FIG. 7. One GSA (GB/T28181 Signal Agent) is deployed on each control node. The first control node, as the main scheduling control node, provides a GSA agent service. The second control node acts as the standby scheduling control node and may periodically detect, through monitoring script, whether the GSA service is switched thereon. In the event that the main scheduling control node is down, the GSA service will be switched onto the standby scheduling control node through the scheduling mechanism stored in the control node. At this time, the standby scheduling control node takes over the scheduling service based on the monitoring result of the periodically operated monitoring script, and thus starts the GSA agent service. Since the GSA service is taken over by another machine, the monitoring script of the original main scheduling control node will initiatively stop the GSA agent service on the original main scheduling control node based on the monitoring result. Furthermore, the original main scheduling control node may be unable to provide the service because it is down.

Figure 4:
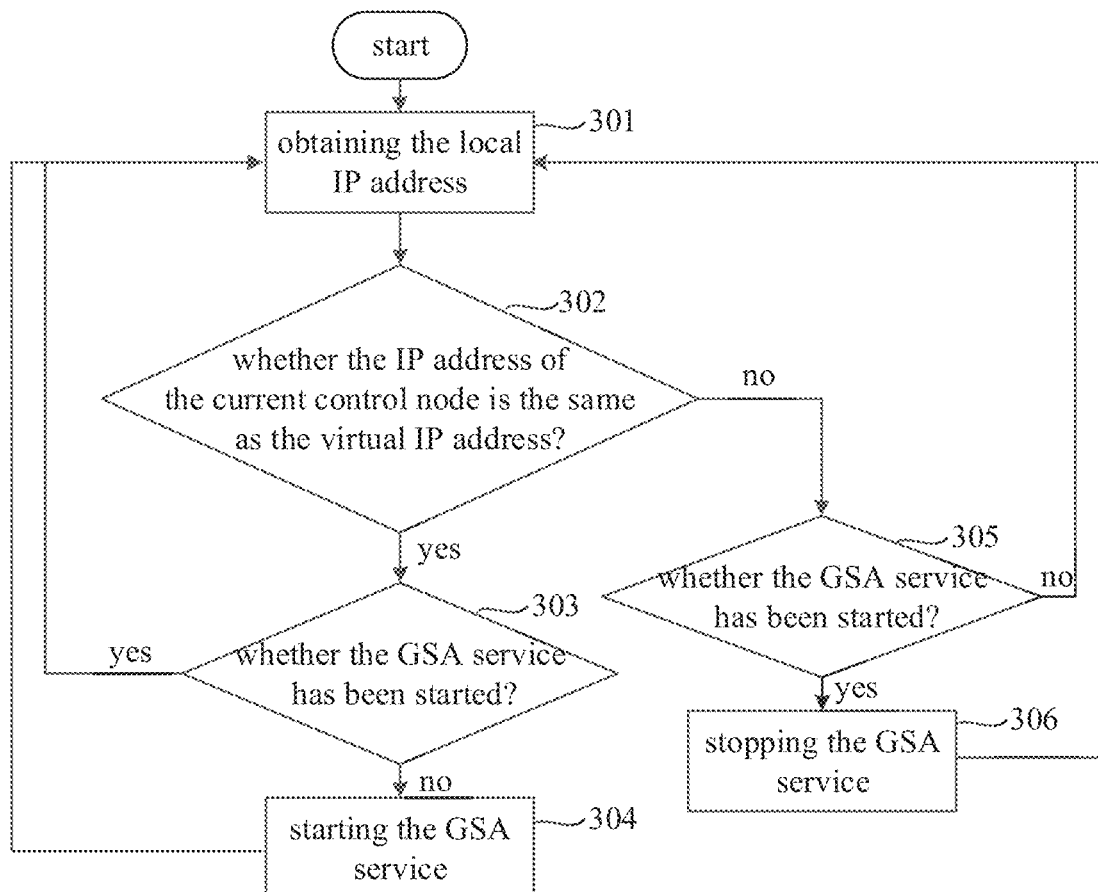
FIG. 4 is a schematic flowchart of a method for video data transmission based on a system for video storage according to a second embodiment of the present application.

The specific process is shown in FIG. 4. At step 301, each control node starts a monitoring script that periodically detects and obtains the local IP address. At step 302, it is determined whether the IP address of the current control node is the same as the virtual IP address configured in a configuration file. If the obtained IP address is the same as the virtual IP address configured in the configuration file, which indicates that this control node is a main scheduling control node, the process thus proceeds to step 303 to check whether this control node has started the GSA service. If this control node has not started the GSA service yet, the process proceeds to step 304 to start the GSA service, and then returns to step 301 to wait for the next detection cycle. If this control node has started the GSA service, the current state of this control node will not be changed, and the process then returns to step 301 to wait for the next detection cycle. If it is determined that the obtained IP address is different from the virtual IP address configured in the configuration file at step 302, which indicates that this control node is not a main scheduling control node, the process proceeds to step 305 to check whether this control node has started the GSA service. If this control node has not started the GSA service yet, the current state of this control node will not be changed, and the process returns to step 301 to wait for the next detection cycle. If this control node has started the GSA service, the process proceeds to step 306 to stop the GSA service of this control node, and then returns to step 301 to wait for the next detection cycle.

As shown in FIG. 7, since there may be many storage nodes, GDAs (GB/T28181 Data Agents) on the storage nodes also need to register at the GSA, such as the main scheduling control node, for unified management. If the main scheduling control node is down, an access failure may occur on these GDAs for a short time (the time is related to the detection period). Once the service is taken over by a standby scheduling control node (for example, after the start of a new detection cycle, the standby scheduling control node starts the GSA service), these GDAs can access the third-party platform normally again. In this embodiment, a GDA may register by the virtual IP technology of the system for video storage. In this way, no matter whether the GSA service is started on the main scheduling control node or on the standby scheduling control node, each GDA registers by the same IP address, and thus there is no need for the GDA to change its registration.

The virtual IP address may be assigned by Linux Virtual Server (abbreviated as "LVS") technology.

The system for video storage constructed using LVS consists of three parts: a loader balancer as the top tier, a server array as the middle tier and a data shared storage as the bottom tier. From the user's point of view, the user only uses high-performance services provided by one virtual server.

In other embodiments of the present application, the virtual IP may be implemented in other manners. For example, the main control node (the physical control node actually corresponding to the virtual IP) transmits to each storage node a first address resolution protocol (abbreviated as "ARP") data packet, which contains information binding the first IP to the MAC address of the main control node, and each storage node updates an ARP table related to the first IP based on the first ARP data packet. In the event that the main control node is unavailable, the standby control node transmits to each storage node a second ARP data packet, which contains information binding the first IP to the MAC address of the standby control node, and each storage node updates the ARP table related to the first IP.

In the system of the embodiment of the present application, since each control node uses a common preset virtual IP address to handle the registrations of data agent modules, when the control node is replaced by another control node because it cannot function properly, there is no need for the data agent modules to re-register.

The present embodiment relates to a method of switching between a main and a standby control nodes (including the signal agent modules therein). Those skilled in the art may understand that the switching between a main and a standby control nodes may also be implemented in other manners. For example, a slave control node (i.e., the standby control node) may periodically perform heartbeat detection on the main control node. If the slave control node, based on the detection, finds that the main control node is unavailable, one of slave control nodes may recommended as a new main control node in a predetermined manner. This new main control node is provided with an IP address same as that of the original main control node. There are also various recommending manners. For example, a slave control node with the highest priority may be selected based on the priority value (preset in each slave control node) of each of the slave control nodes. For another example, a slave control node with the highest processing capacity may be selected based on the processing capacity of each of the slave control nodes, and so on.

The present embodiment is a method embodiment corresponding to the first embodiment, and the present embodiment may be implemented in cooperation with the first embodiment. The related technical details mentioned in the first embodiment can apply to the present embodiment, and will not described again to avoid unnecessary repeated description. Correspondingly, the related technical details mentioned in the present embodiment may also apply to the first embodiment.

A third embodiment of the present application relates to a method for video data transmission based on a system for video storage, and this system for video storage is the same as the system for video storage in the second embodiment. The system for video storage includes: a first control node, a second control node and at least two storage nodes. The at least two storage nodes are configured for storing video data. Each control node includes a signal agent module. Each storage node includes a data agent module. The signal agent module of the first control node interacts with a third-party platform based on a predetermined signal protocol through a preset virtual IP address. In other words, one of the control nodes is a main control node, and the other control nodes are standby control nodes. In the event that the main control node becomes unavailable, a standby control node operates as a main control node. The main control node communicates with the third-party platform and storage nodes through the preset virtual IP address.

Figure 5:
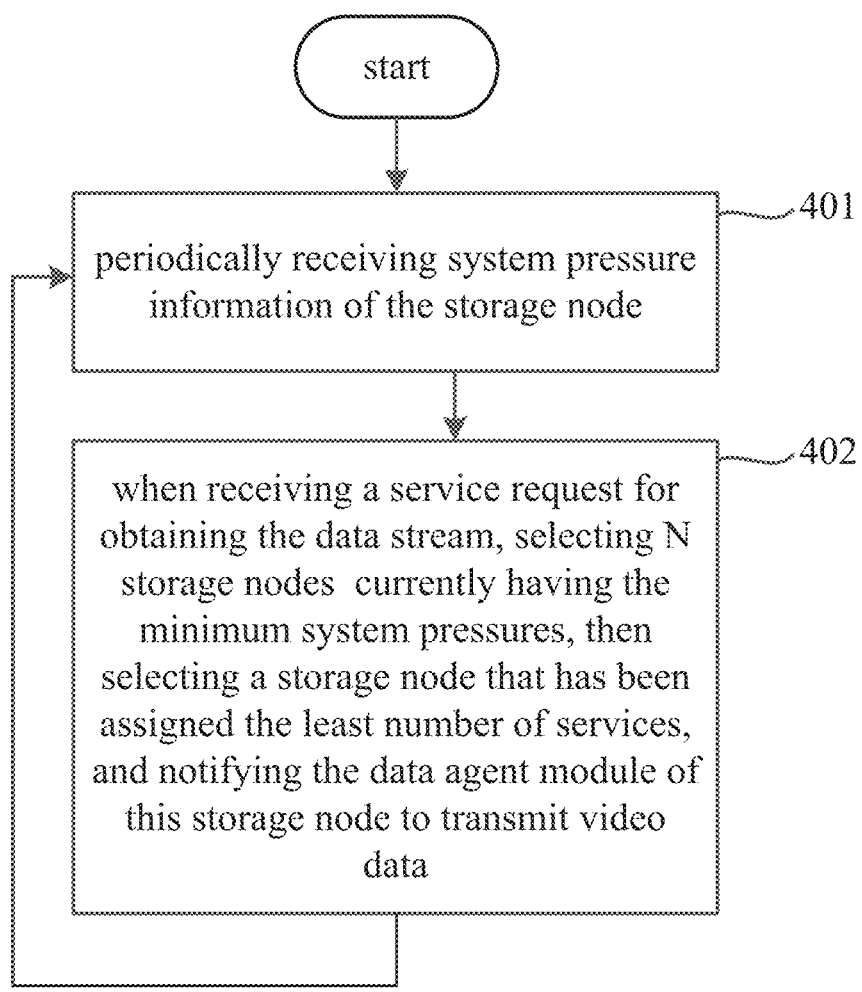
FIG. 5 is a schematic diagram of specific steps of a method for video data transmission based on a system for video storage according to a third embodiment of the present application.

The present embodiment provides a specific load balance method based on the second embodiment described above. Specifically, transmitting an instruction to the data agent module of a designated storage node based on a service request at step 720 in FIG. 2 further contains the following sub-steps, as illustrated in FIG. 5.

At step 401, system pressure information of each storage node may be received from the data agent module of the storage node. In one embodiment, the system pressure information includes factors, such as a central processing unit (abbreviated as "CPU") utilization rate, a memory utilization rate, and a network bandwidth utilization rate. The weighted average is performed on these factors to obtain a value representative of the system pressure of the storage node, i.e., the system pressure information.

At step 402, when the service request for obtaining video data is received from the third-party platform, N storage nodes currently having the minimum system pressures are selected based on the system pressure information of each of the storage nodes; a storage node that has been assigned the least number of services are then selected from the N storage nodes, and the data agent module of this storage node is notified to transmit the video data to the third-party platform. N is a positive integer and less than the total number of the storage nodes in the system for video storage. Specifically, the system for video storage in this embodiment interacts with the third-party platform using a predetermined signal protocol. Optionally, N is half of the total number of storage nodes in the system for video storage. In addition, it can be understood that in other embodiments of the present application, N may be another number, such as 30% or 60% of the total number of the storage nodes, or N may be a predetermined fixed number.

In an example that the predetermined signal protocol is the GB/T28181 protocol, a single GSA manages multiple GDAs. When the GSA processes a session request (i.e., the service request for obtaining video data) transmitted by a third-party platform, the GSA will intelligently select a certain GDA to process the service requested by the third-party platform. A GDA may periodically report the system pressure information of the storage node where the GDA is located. In practical applications, the GSA may select a GDA as follows.

1. Detecting the system pressure information of the storage nodes where the GDAs are located, and selecting several storage nodes with the minimum system pressures from all the storage nodes (the number of the selected storage nodes=the number of GDAs*50%);

2. Selecting one GDA that has been assigned the least number of services from the GDAs of the selected storage nodes; and 3. Assigning the current service (for example, a task for obtaining streams) to the selected GDA.

The specific way that the GSA selects a GDA is similar to that in the embodiments above, and will not be described again.

During load balancing of storage nodes, N storage nodes with the minimum system pressures may be found first, and then a storage node that has been assigned the least number of services is selected from the N storage nodes. This may prevent the system from assigning the video related service to a storage node too many resources of which are occupied by non-video services, and thereby avoid interruption of video data services or failure of service assignment.

In addition, it can be understood that in other embodiments of the present application, other approaches of load balancing may also be used, for example, assigning a service request to a storage node that currently has the least number of services, assigning a service request to a storage node that currently has the largest remaining bandwidth, or assigning a service request to the storage nodes in turn.

Figure 6:
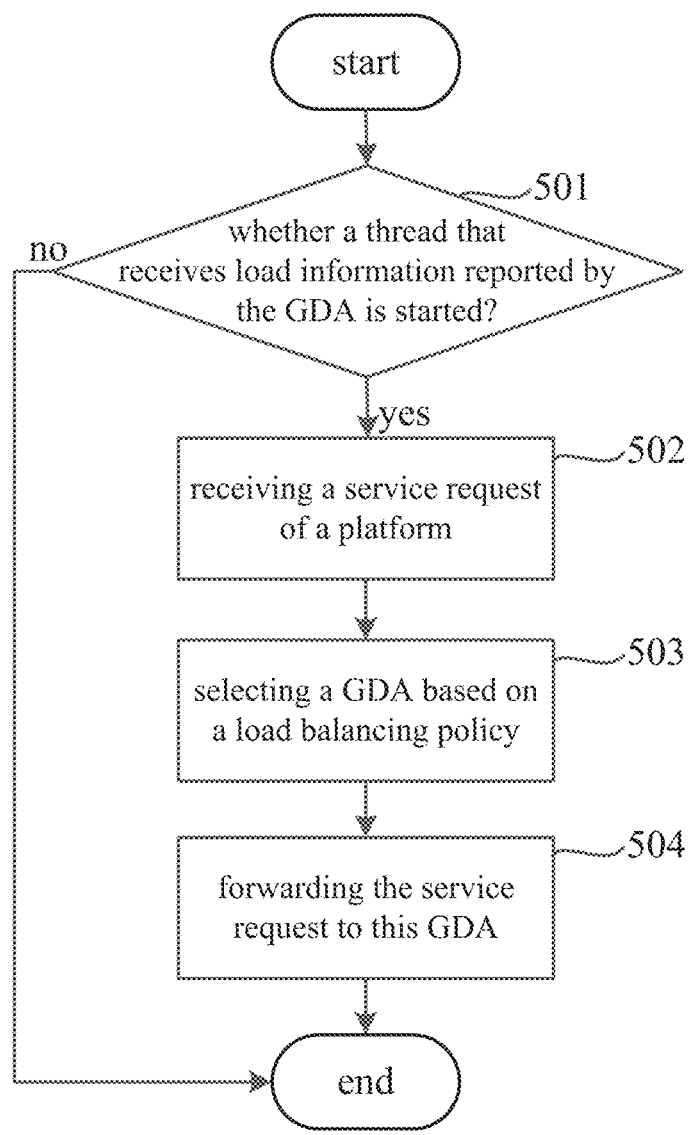
FIG. 6 is a schematic diagram of a load balance principle based on a system for video storage according to a third embodiment of the present application.

In one embodiment, a load balancing process is shown in FIG. 6. At step 501, it is determined whether a thread that receives load information reported by a GDA is started; and if the thread is started, the reported load information is received, the cache is updated, and step 502 is performed to receive a service request from the third-party platform. Step 503 is then performed to select a GDA based on a load balancing policy. Then, step 504 is performed to forward the service request to this GDA. Optionally, the load information reported by the GDA includes the number of services being processed by the GDA.

It can be understood that, at step 501, if it is determined that the thread that receives the load information reported by the GDA is not started, the load balancing process may be directly ended.

The present embodiment is a method embodiment corresponding to the first embodiment, and the present embodiment may be implemented in cooperation with the first embodiment. The related technical details mentioned in the first embodiment can apply to the present embodiment, and will not described again in order to avoid unnecessary repeated description. Correspondingly, the related technical details mentioned in the present embodiment may also apply to the first embodiment.

In addition, an embodiment of the present application further provides an application program that, when executed, carries out the method for video data transmission based on a system for video storage provided by the embodiment of the present application.

The system for video storage provided by the embodiment of the present application includes: a first control node, a second control node and at least two storage nodes. The at least two storage nodes are configured for storing video data.

Each control node includes a signal agent module. Each storage node includes a data agent module. The signal agent module of the first control node interacts with a third-party platform based on a predetermined signal protocol through a preset virtual IP address.

The method for video data transmission based on the system for video storage includes:

starting, by the second control node, the signal agent module of the second control node after the second control node determines that the first control node is unavailable;

receiving a service request from the third-party platform based on the predetermined signal protocol through the preset virtual IP address, and transmitting an instruction to the data agent module of a designated storage node based on the service request, by the signal agent module of the second control node; and transmitting, by the data agent module of the designated storage node, video data to the third-party platform according to the received instruction, based on the predetermined signal protocol.

In an embodiment of the application, the method may further include:

periodically obtaining, by each control node, an IP address of this control node, and if the IP address of this control node is the same as the preset virtual IP address and the signal agent module of this control node has not been started yet, starting the signal agent module of this control node, or if the IP address of this control node is different from the preset virtual IP address and the signal agent module of this control node has been started, stopping the signal agent module of this control node.

In an embodiment of the application, the method may further include:

periodically receiving, by the signal agent module of the second control node, system pressure information of each of the storage nodes from the data agent module of this storage node.

Correspondingly, transmitting an instruction to the data agent module of a designated storage node based on the service request, may include:

based on the system pressure information of each of the storage nodes, selecting N storage nodes currently having the minimum system pressures, then selecting, from the N storage nodes, a storage node that has been assigned the least number of services, and notifying the data agent module of this storage node to transmit the video data to the third-party platform; wherein N is a positive integer and less than the total number of the storage nodes in the system for video storage.

In an embodiment of the present application, the virtual IP address is preset through Linux virtual server technology.

In an embodiment of the present application, the predetermined signal protocol is a GB/T28181 protocol.

It can be seen that, by executing the application program provided by the embodiment of the present application, after the first control node is unavailable, the system can switch to the signal agent module of another control node to continue to interact with the third-party platform based on the signal protocol through the same virtual IP address, effectively avoiding the single point of failure and ensuring the stability of the system.

The embodiment of the application program is described briefly, since it is substantially similar to the embodiment of the method, and the related content can refer to the description of the embodiment of the method.

In addition, an embodiment of the present application also provides a storage medium for storing an application program which, when executed, performs the method for video data transmission based on a system for video storage provided by the embodiment of the present application.

The system for video storage provided by the embodiment of the present application includes: a first control node, a second control node and at least two storage nodes. The at least two storage nodes are configured for storing video data. Each of the control nodes includes a signal agent module. Each of the storage nodes includes a data agent module. The signal agent module of the first control node interacts with a third-party platform based on a predetermined signal protocol through a preset virtual IP address.

The method for video data transmission based on a system for video storage, include:

starting, by the second control node, the signal agent module of the second control node after the second control node determines that the first control node is unavailable;

receiving a service request from the third-party platform based on the predetermined signal protocol through the preset virtual IP address, and transmitting an instruction to the data agent module of a designated storage node based on the service request, by the signal agent module of the second control node; and transmitting, by the data agent module of the designated storage node, video data to the third-party platform according to the received instruction, based on the predetermined signal protocol.

In an embodiment of the application, the method may further include:

periodically obtaining, by each of the control nodes, an IP address of this control node, and if the IP address of this control node is the same as the preset virtual IP address and the signal agent module of this control node has not been started yet, starting the signal agent module of this control node, or if the IP address of this control node is different from the preset virtual IP address and the signal agent module of this control node has been started, stopping the signal agent module of this control node.

In an embodiment of the application, the method may further include:

periodically receiving, by the signal agent module of the second control node, system pressure information of each of the storage nodes from the data agent module of this storage node.

Correspondingly, transmitting an instruction to the data agent module of a designated storage node based on the service request, may include:

based on the system pressure information of each of the storage nodes, selecting N storage nodes currently having the minimum system pressures, then selecting, from the N storage nodes, a storage node that has been assigned the least number of services, and notifying the data agent module of this storage node to transmit the video data to the third-party platform; wherein N is a positive integer and less than the total number of the storage nodes in the system for video storage.

In an embodiment of the present application, the virtual IP address is preset through Linux virtual server technology.

In an embodiment of the present application, the predetermined signal protocol is a GB/T28181 protocol.

It can be seen that, by executing the application program stored in the storage medium provided by the embodiment of the present application, after the first control node is unavailable, the system can switch to the signal agent module of another control node to continue to interact with the third-party platform based on and the signal protocol through the same virtual IP address, effectively avoiding the single point of failure and ensuring the stability of the system.

The embodiment of the storage medium is described briefly, since it is substantially similar to the embodiment of the method, and the related content can refer to the description of the embodiment of the method.

Each of the method embodiments of the present application may be implemented as software, hardware, firmware, or the like. No matter whether the application is implemented as software, hardware or firmware, instruction codes can be stored in any kind of computer-accessible memory (such as permanent or revisable, volatile or non-volatile, solid or non-solid, fixed or replaceable medium). Similarly, the memory may be, for example, Programmable Array Logic (abbreviated as "PAL"), Random Access Memory (abbreviated as "RAM"), Programmable Read Only Memory (abbreviated as "PROM"), Read-Only Memory (abbreviated as "ROM"), Electrically Erasable Programmable ROM (abbreviated as "EEPROM"), Magnetic Disk, Light Disk, Digital Versatile Disc (abbreviated as "DVD") and so on.

It should be noted that in the claims and the description of the application, the relationship terms, such as "first", "second", and the like are only used to distinguish one entity or operation from another entity or operation, but do not necessarily require or imply that there is an actual relationship or order between these entities or operations. Moreover, the terms "include", "comprise", or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "includes(s) a/an", "comprise(s) a/an" do not exclude additional identical elements in the processes, methods, articles, or devices, including the listed elements.

Although the present application is illustrated and described with certain optional embodiments of the present application, those skilled in the art should understand that various changes can be made in form and details without departing from the spirit and scope of the present application.

The invention claimed is:

1. A system for video storage comprising: a first control node, a second control node and at least two storage nodes, wherein
   the at least two storage nodes are configured for storing video data;
   each of the first control node and the second control node comprises a signal agent module, and each of the at least two storage nodes comprises a data agent module;
   the signal agent module of the first control node is configured for receiving a service request from a third-party platform based on a predetermined signal protocol through a preset virtual IP address, and transmitting an instruction to the data agent module of a designated storage node based on the service request;
   the second control node is configured for starting the signal agent module of the second control node after determining that the first control node is unavailable;
   the signal agent module of the second control node is configured for receiving a service request from the third-party platform based on the predetermined signal protocol through the preset virtual IP address, and transmitting an instruction to the data agent module of a designated storage node based on the service request; and
   the data agent module of the designated storage node is configured for transmitting video data to the third-party platform according to the received instruction, based on the predetermined signal protocol,
   wherein only one of the signal agent module of the first control node and the signal agent module of the second control node is registered at one third-party platform at any time.

2. The system for video storage of claim 1, wherein the first control node and/or the second control node further comprises:
   an IP obtaining unit, configured for periodically obtaining an IP address of the control node where it is located;
   a signal agent control unit, configured for controlling the signal agent module of the control node where it is located based on the IP address obtained by the IP obtaining unit and a current state of the signal agent module of this control node, wherein if the IP address of this control node is the same as the preset virtual IP address and the signal agent module of this control node has not been started yet, the signal agent control unit starts the signal agent module of this control node; or, if the IP address of this control node is different from the preset virtual IP address and the signal agent module of this control node has been started, the signal agent control unit stops the signal agent module of this control node.

3. The system for video storage of claim 1, wherein the signal agent module comprises:
   a system pressure information acquisition unit, configured for periodically receiving system pressure information of each of the storage nodes from the data agent module of this storage node;
   a service assignment unit, configured for, when receiving a service request for obtaining the video data from the third-party platform, based on the system pressure information of each of the storage nodes received by the system pressure information acquisition unit, selecting N storage nodes currently having the minimum system pressures; then selecting, from the N storage nodes, a storage node that has been assigned the least number of services, and notifying the data agent module of the storage node to transmit the video data to the third-party platform; wherein N is a positive integer and less than the total number of the storage nodes in the system for video storage.

4. The system for video storage of claim 3, wherein the data agent module comprises:
   a pressure information reporting unit, configured for transmitting to the signal agent module the system pressure information of a storage node where the data agent module is located.

5. The system for video storage of claim 1, wherein the virtual IP address is preset based on Linux virtual server technology.

6. The system for video storage of claim 1, wherein the predetermined signal protocol is a GB/T28181 protocol.

7. A method for video data transmission based on a system for video storage, wherein the system for video storage comprises: a first control node, a second control node, and at least two storage nodes for storing video data; each of the first control node and the second control node comprises a signal agent module; each of the at least two storage nodes comprises a data agent module; the signal agent module of the first control node is configured for receiving a service request from a third-party platform based on a predetermined signal protocol through a preset virtual IP address, and transmitting an instruction to the data agent module of a designated storage node based on the service request; and the method comprises:

starting, by the second control node, the signal agent module of the second control node after the second control node determines that the first control node is unavailable;

receiving a service request from the third-party platform based on the predetermined signal protocol through the preset virtual IP address, and transmitting an instruction to the data agent module of a designated storage node based on the service request, by the signal agent module of the second control node; and transmitting, by the data agent module of the designated storage node, video data to the third-party platform according to the received instruction, based on the predetermined signal protocol, wherein only one of the signal agent module of the first control node and the signal agent module of the second control node is registered at one third-party platform at any time.

8. The method for video data transmission based on a system for video storage of claim 7, further comprising:

periodically obtaining, by each of the control nodes, an IP address of this control node, and if the IP address of this control node is the same as the preset virtual IP address and the signal agent module of this control node has not been started yet, starting the signal agent module of this control node, or if the IP address of this control node is different from the preset virtual IP address and the signal agent module of this control node has been started, stopping the signal agent module of this control node.

9. The method for video data transmission based on a system for video storage of claim 8, wherein the virtual IP address is preset through Linux virtual server technology.

10. The method for video data transmission based on a system for video storage of claim 7, further comprising:

periodically receiving, by the signal agent module of the second control node, system pressure information of each of the storage nodes from the data agent module of this storage node;

wherein transmitting an instruction to the data agent module of a designated storage node based on the service request, comprises:

based on the system pressure information of each of the storage nodes, selecting N storage nodes currently having the minimum system pressures, then selecting, from the N storage nodes, a storage node that has been assigned the least number of services, and notifying the data agent module of this storage node to transmit the video data to the third-party platform; wherein N is a positive integer and less than the total number of the storage nodes in the system for video storage.

11. The method for video data transmission based on a system for video storage of claim 10, wherein the predetermined signal protocol is a GB/T28181 protocol.

12. A storage medium for storing an application program that, when executed, performs the method for video data transmission based on a system for video storage of claim 7.

* * * * *